United States Patent [19]
Hafele

[11] 3,954,186
[45] May 4, 1976

[54] APPARATUS FOR EXTRACTING BLOWN ARTICLES FROM SPLIT BLOW MOLDS

[75] Inventor: Robert X. Hafele, Baton Rouge, La.

[73] Assignee: Ethyl Development Corporation, Kansas City, Mo.

[22] Filed: Nov. 27, 1974

[21] Appl. No.: 527,701

[52] U.S. Cl................ 214/1 BC; 65/260; 214/1 B; 425/436 R; 425/455 R; 425/806
[51] Int. Cl.².............. B65G 65/00; B29C 7/00
[58] Field of Search............ 425/436 R, 441, 455, 425/806; 214/1 B, 1 BC; 264/138, 161; 65/260

[56] References Cited
UNITED STATES PATENTS

| | | | |
|---|---|---|---|
| 1,792,267 | 2/1931 | Badger | 65/260 X |
| 2,843,166 | 7/1958 | Alstyne | 214/1 B |
| 3,306,442 | 2/1967 | Devol | 214/1 B X |
| 3,357,043 | 12/1967 | Doucet | 425/444 |
| 3,417,428 | 12/1968 | Rupert | 425/441 X |
| 3,710,954 | 1/1973 | Hutchison | 214/1 B X |
| R28,089 | 7/1974 | Devol | 214/1 B X |

*Primary Examiner*—Robert L. Spicer, Jr.
*Attorney, Agent, or Firm*—Donald L. Johnson; John F. Sieberth; Edgar E. Spielman, Jr.

[57] ABSTRACT

This invention relates to an apparatus for extracting blown plastic articles from split blow molds and for precisely placing the extracted article at a receiving point such as on a moving conveyor belt. The apparatus includes a gripping mechanism for gripping the article, means for moving the gripping mechanism to and from the article, means for arcuately moving the gripping mechanism and gripping actuator means to cause the gripping mechanism to grip and release the article when desired.

7 Claims, 7 Drawing Figures

APPARATUS FOR EXTRACTING BLOWN ARTICLES FROM SPLIT BLOW MOLDS

BACKGROUND OF THE INVENTION

It is known that hollow, plastic articles, such as containers, may be formed by blow molding techniques. A tubular parison of thermoplastic material that has been softened sufficiently to allow expansion under internal pressure is clamped at its opposite ends between a pair of mold halves. The cavity in the mold surrounds the parison. Air is injected into the interior of the parison under pressure through a blow needle or blow pin. The air pressure causes the parison to expand until it conforms to the shape of the mold cavity. When the mold sections are separated, the hollow molded article is removed from the mold and excess material such as tail and/or neck moils are separated from the article, if necessary. The removal of the article from the mold is usually achieved by merely opening the mold sections and allowing the article to fall therefrom. In those cases where the article does not freely fall, mechanisms have been devised which knock the article out of the mold halves. In these instances there is no precision placement of the article, and the article is usually allowed to fall into a collection bin. The articles then must be removed from the bin, usually by hand, and sent to a second station where excess plastic is removed. As can be appreciated, the utilization of hand labor resulting from this imprecise method of article placement is costly and thus derogates from process efficiency.

Therefore it is an object of this invention to provide an apparatus for removing blown plastic articles from mold halves which allows for precision placement of the removed article. It is another object of this invention to provide an apparatus for positive removal of hollow plastic articles from mold halves. It is a further object of this invention to provide an apparatus for removing blown plastic articles from blow molding machines which apparatus is adapted for use on different types of blow molding machines.

THE INVENTION

The apparatus of this invention is for removing, from a split blow mold, a blow-molded, plastic article which has a tail extending out of the mold. The removed plastic article may then be precisely placed by the apparatus on conveyor means for movement to other work stations for tail removal, neck reaming, deflashing, etc. The apparatus comprises; gripping members for gripping the tail, a mechanism for actuating the gripping members to cause them to open and close, an assembly attached to the gripping actuation mechanism for imparting arcuate motion to the gripping members, a second mechanism for longitudinally moving the gripping members to and from the blow mold and a support structure for supporting the foregoing components in a position adjacent to the blow mold.

The apparatus of this invention may also optionally incorporate ejection mechanisms attached to the gripping members which aid in ejecting the article from the gripping members when the gripping members are in open position.

The apparatus of this invention is highly advantageous in that it is possible to remove blow molded plastic articles from split molds and place the removed article in a precise position such as on a conveyor belt. It should be emphasized that all of the motions of the apparatus of this invention, i.e., the extraction and placement of the blow molded article, are performed in a positive manner, that is to say, there is dependency on passive means, e.g. gravity, required to remove the article from the blow mold. The apparatus of this invention operates automatically to place the articles on a conveyor belt for movement to other work stations thus alleviating the use of human labor heretofore required to transport the articles to other work stations. Another feature of the present invention is that it provides positive removal of the article from the blow mold thus insuring that the article will not hang up in the mold and render the blow molding machine inoperative.

These and other features of the invention contributing to its use and economy will be more fully understood from the following description of a preferred embodiment of this invention when taken in connection with the accompanying drawings wherein identical numbers refer to identical parts and in which.

Figure 1:
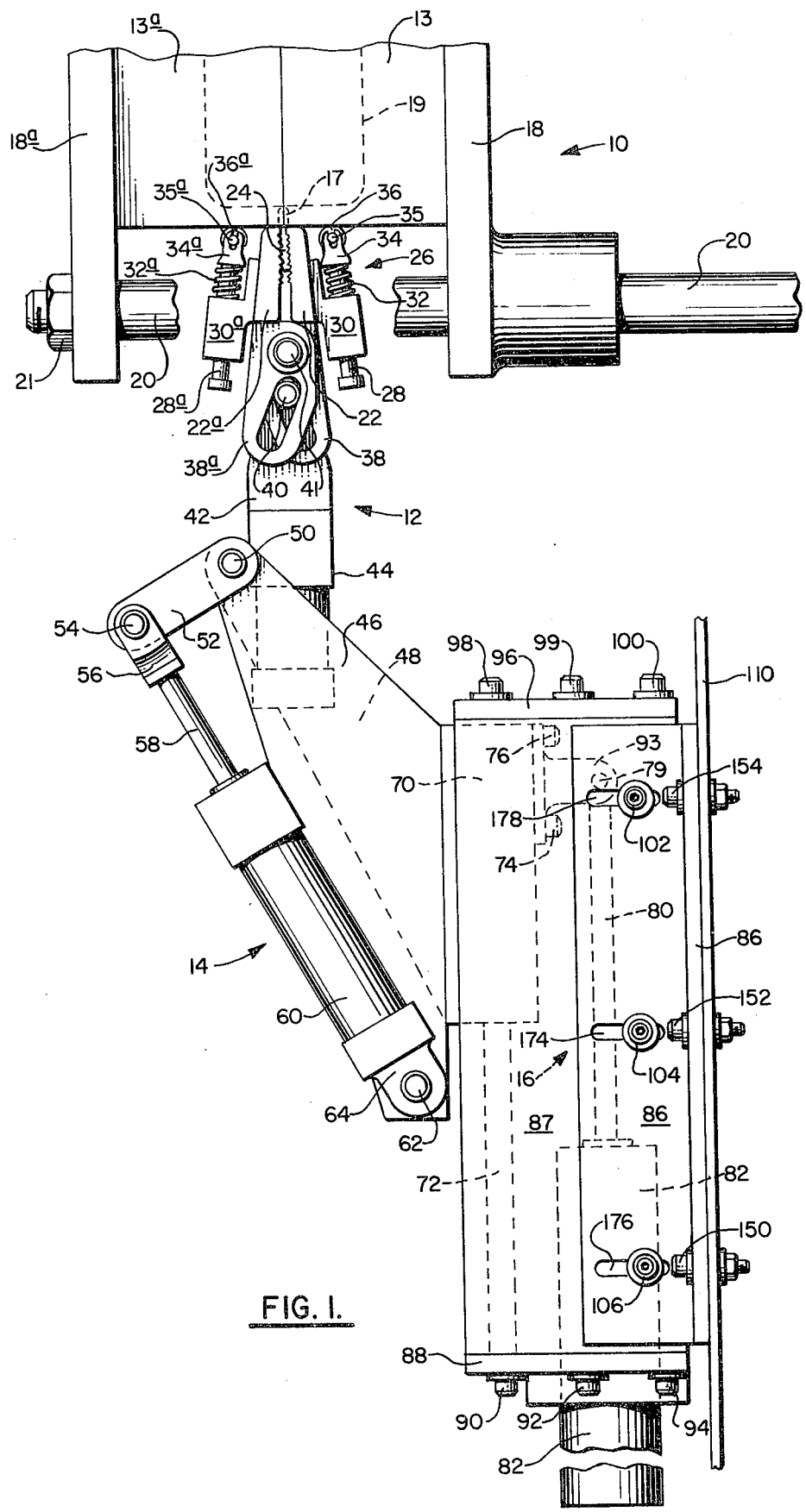
FIG. 1 is a right side elevational view of an apparatus of this invention positioned adjacent to a split blow mold, partially shown.
Figure 2:
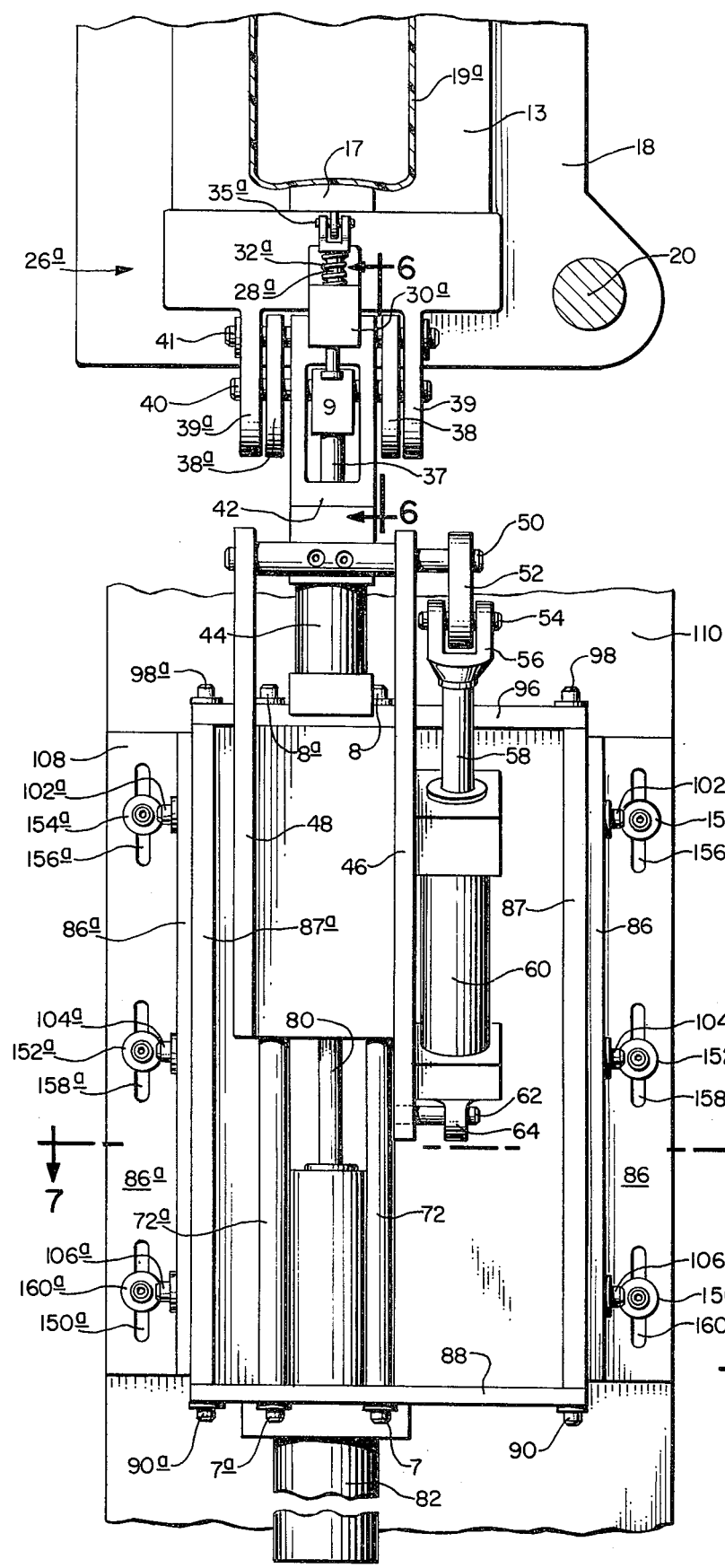
FIG. 2 is a front elevational view of the apparatus of FIG. 1.

Referring now to FIGS. 1 and 2, it can be seen that the apparatus of this invention is positioned beneath and adjacent to a split blow mold assembly generally designated by the numeral 10. The split blow mold assembly 10 has side platens 18 and 18a for holding the mold portions in place. Lower mold portions 13 and 13a are shown in the Figures. For opening and closing the split blow mold push rod 20 and other conventional power application components (not shown) are provided. Push rod 20 is held in place by push rod nut 21. The cavity of the blow mold which defines the shape of the hollow, plastic article is shown by the dotted lines and designated by the number 19 in FIG. 1. Extending from plastic article 19a out of the mold is the tail 17 as seen in FIG. 2.

Turning now to the apparatus of this invention, it can be seen that the apparatus comprises five main parts; a gripping and ejection assembly generally designated by the numeral 26, a gripping actuator assembly generally designated by the numeral 12, an arcuate rotating assembly generally designated by the numeral 14, a longitudinal moving assembly generally designated by the numeral 16, and a support and adjustment structure, hereinafter described, for maintaining the aforementioned assemblies in proper position with relation to plastic article tail 17.

Gripping and ejection assembly 26 functions to grip plastic tail 17 and to subsequently eject the hollow article when the assembly is in an open position. Gripping of tail 17 is achieved by jaws 22 and 22a. As can be seen from the drawing, the jaws preferably have oppositely opposed serated jaw teeth 24—24 to aid in positive gripping of tail 17. The jaws illustrated in the drawings are generally rectangular in shape; however other shapes are permissible as the need may arise. To aid in ejection of plastic article 19a from jaws 22 and 22a an ejection mechanism is provided. This mechanism is mounted on jaws 22 and 22a. Each ejector has a spring ejector mount 30 and 30a. Within spring ejector mounts 30 and 30a are ejector plungers 28 and 28a, respectively. It should be noted that one end of the ejector plungers 28 and 28a has a large diameter stop to prevent the passage of ejector plungers 28 and 28a out from spring ejector mounts 30 and 30a, respectively. Force for ejection is provided by ejector springs 32 and 32a which fit around ejector plungers 28 and 28a, respectively. Mounted on the top of plungers 30 and 30a are roller housings 34 and 34a. These housings, as can be seen from the drawings, are designed to hold rollers 36 and 36a by means of roller pins 35 and 35a which fit snugly within housings 34 and 34a respectively. Jaws 22 and 22a are held in a pivotal position by jaw pivot pin 40.

Depending in a downward direction and attached to jaws 22 and 22a are right slotted jaw legs 38 and 38a and left slotted jaw legs 39 and 39a. Slotted jaw legs 38a and 39a are attached to jaw 22a while slotted jaw legs 38 and 39 are attached to jaw 22. As can be seen from the drawings, the slots overlie one another and form an acute angle with one another. When actuator slot pin 40 is positioned within slots of slotted jaw legs 38, 38a, 39 and 39a a toggle arrangement is achieved. This toggle arrangement provides a means by which jaws 22 and 22a may be opened and closed as actuator slot pin 40 moves up and downward in a vertical direction thus causing movement in jaws 22 and 22a. Actuator slot pin 40 is attached to actuator arm 39 by means of actuator arm connector 9. Actuator arm 39 is used to transfer force from double acting pneumatic actuator cylinder 44 thereby giving the aforementioned vertical movement to actuator slot pin 40. Actuator yoke 42 which is attached to the upper portion of double-acting pneumatic actuator cylinder 44 is used to aid in guidance of actuator slot pin 40 to insure its vertical movement and is also used to carry jaws 22 and 22a by way of jaw pivot pin 41.

Double-acting pneumatic actuator cylinder 44 is rigidly attached to actuator mount pin 50. Actuator mount pin 50 is also rigidly attached to arcuate rotating arm 52. Actuator mount pin 50 is held in support by right support member 46 and left support member 48.

The arcuate rotating assembly 14 is carried by right and left support members 46 and 48. As mentioned previously, arcuate rotating arm 52 is rigidly mounted to actuator mount pin 50. As can be seen from the drawing, arcuate rotating arm 52 is an elongated arm having two ends. The end opposite arcuate rotating arm 52's attachment to actuator mount pin 50 is mounted double-acting pneumatic arcuate cylinder arm 58 by way of arcuate cylinder arm connector 56 and arcuate cylinder arm connector pin 62. This mount is a rotatable mount as is distinguished from the rigid mount achieved at actuator mount pin 50. Double-acting pneumatic arcuate cylinder 60 is mounted to right support member 46 by means of arcuate cylinder connector 64 and arcuate cylinder connecting pin 62.

Double-acting pneumatic arcuate cylinder 60 is utilized to apply force to arcuate cylinder arm 58 thereby causing arcuate rotating arm 52 to rotate about an axis through actuator mount pin 50. Since jaws 22 and 22a are carried on double-acting pneumatic actuator cylinder 44 which is rigidly mounted to actuator mount pin 50, jaws 22 and 22a are also caused to rotate about this same axis.

Longitudinal moving assembly 16 is connected to right and left support members 46 and 48. This connection is achieved by connecting right and left support members 46 and 48, respectively, to longitudinal moving block 70. Moving block 70 is held in position by longitudinal moving block guides 72 and 72a which pass through apertures in longitudinal moving block 70. These guides are attached to a cage hereinafter described. An upward and downward vertical force is applied to longitudinal moving block 70 by means of longitudinal moving arm 80. Longitudinal moving block 70 is connected to longitudinal moving arm 80 by means of longitudinal block connector 93, longitudinal block connector pin 79, and longitudinal block connector bolts 76 and 71 as shown in FIG. 1. Force is applied to longitudinal moving arm 80 by double-acting pneumatic longitudinal cylinder 82.

Referring now to FIGS. 1 and 2, it is clear that upward extension of longitudinal moving arm 80 causes the gripping and ejecting assembly, the gripping actuator assembly and the arcuate rotating assembly to all move upwards toward split blow mold 10. Retraction of longitudinal moving arm 80 will cause these assemblies to move downward and away from split blow mold 10.

Holding the before-described assemblies in support and making possible adjustment of position of these assemblies is a cage and cooperating assembly plate. The cage comprises right side cage wall 87, left side cage wall 87a, top cage wall 96 and bottom cage wall 88. These cage walls are held one to the other by right bottom cage wall bolts 90, 92 and 94 and right top cage bolts 98, 99 and 100. Other cage bolts as shown are left bottom cage bolt 90a. Other cage bolts which are not shown but which are in a position symetrical with those shown are those cage bolts at the left bottom of the cage and at the left top of the cage.

Adjustment of the cage to aid in positioning of the before-described assemblies is achieved by utilization of rear adjustment plate 108, right adjustment side plate 86 and left adjustment side plate 86a. As can be seen from the drawings, these adjustment plates have slots therein through which adjustment bolts are passed to connect to the side cage walls. The right adjuster side bolts are designated by the numerals 102, 104 and 106 while the left adjuster side bolts are designated by the numerals 102a, 104a and 106a. The right rear adjustment bolts are designated by the numerals 150, 152 and 154 while the left rear adjustment bolts are designated by the numerals 150a, 152a and 154a. Cooperating with the right rear adjustment bolts are right rear adjustment slots 156, 158 and 160; while cooperation between the left adjustment side bolts is achieved with left rear adjustment slots 156a, 158a and 160a. Right rear and left rear adjustment bolts are attached to mounting surface 110 which can be any suitable structure.

Figure 3:
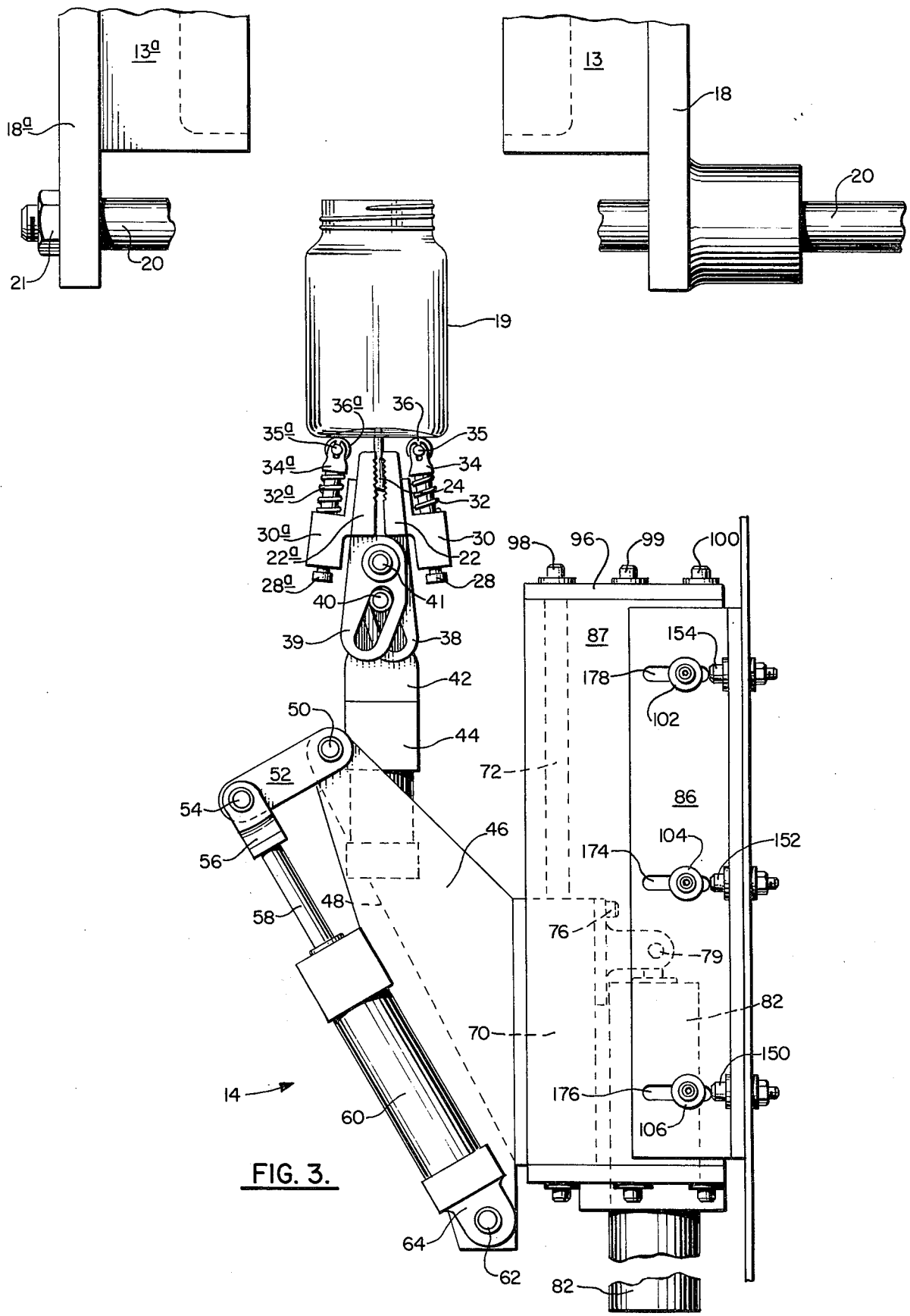
FIG. 3 is a right side elevational view of the apparatus shown in FIG. 1 in the extraction position and the partially shown blow mold in the open position.

FIGS. 1, 3-5 illustrate the apparatus of this invention in operation. As can be seen in FIG. 1, gripping and ejecting assembly 26, gripping actuation assembly 12, arcuate rotating assembly 14 and longitudinal moving assembly 16 are in an upward position. The jaws 22 and 22a have gripped plastic article tail 17. Mold halves 13 and 13a are still in the closed position. In FIG. 3 mold halves 13 and 13a are in the open position while container 19a is being carried by attachment to plastic article tail 17 which is gripped by jaws 22 and 22a. Ejector rollers 36 and 36a are pressing against the bottom of plastic article 19a holding it in tension. It should also be noted that longitudinal moving assembly 16 is in a downward position.

Figure 4:
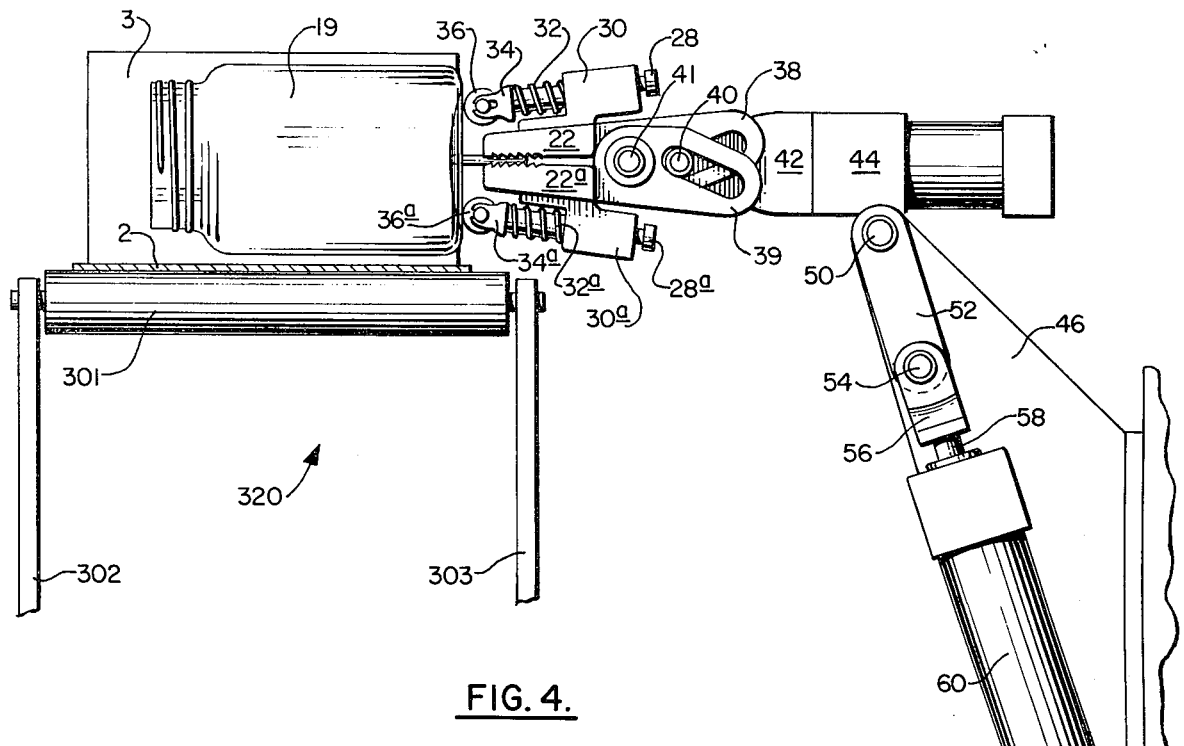
FIG. 4 is a partial, right side elevational view of the apparatus of FIG. 1 after rotation of the article and positive placement of same on a conveyor belt, partially shown.

FIG. 4 depicts arcuate rotation of gripping and ejection assembly 26 and gripping actuation assembly 12 by arcuate rotating assembly. This is achieved by retraction of arcuate rotating arm 52 by arcuate cylinder arm 58. At this point the plastic article is in position over conveyor belt 2 which is carried by conveyor supports 303 and 302 and conveyor belt roller 301. Conveyor belt partition 3 is used to keep adjacent articles 19a—19a in a spaced-apart position on the conveyor belt 2 upon release of successive articles 19a from jaws 22 and 22a.

Figure 5:
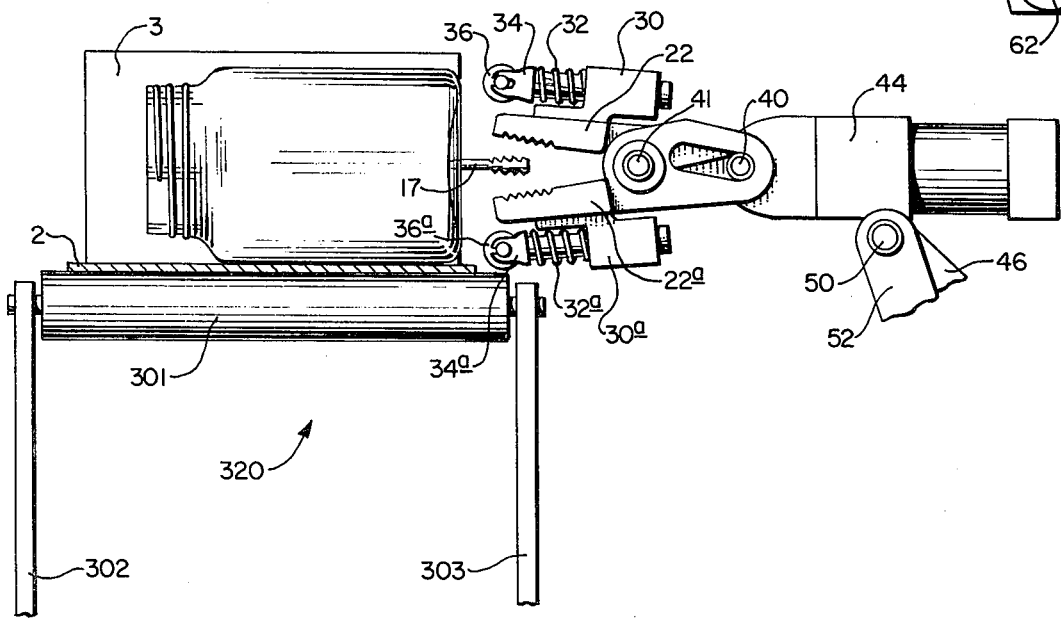
FIG. 5 is a partial, right side elevational view of the apparatus of FIG. 1 in the ejection position with the article being placed on the conveyor belt, partially shown.

In FIG. 5 it can be seen that actuator slot pin 40 is pulled towards pneumatic actuator cylinder 44 by actuator arm 39. This movement of actuator slot pin 40 in slotted jaw legs 38, 38a, 39 and 39a causes jaws 22 and 22a to pen and release plastic article tail 17 and the plastic article 19a itself. Rollers 36 and 36a are then free to eject article 19a from jaws 22 and 22a by means of spring pressure exerted by springs 32 and 32a. Springs 32 and 32a also aid in stabilizing the container when it is in a vertical position and during rotation. After release of plastic article 19a continuation of the apparatus cycle includes return arcuate movement of gripping assembly 26 and gripping actuator assembly 44, raising of the assemblies by longitudinal moving assembly 16 and finally closing of jaws 22 and 22a by upward movement of actuator slot pin 40 so that jaws 22 and 22a grip another plastic article tail.

Figure 6:
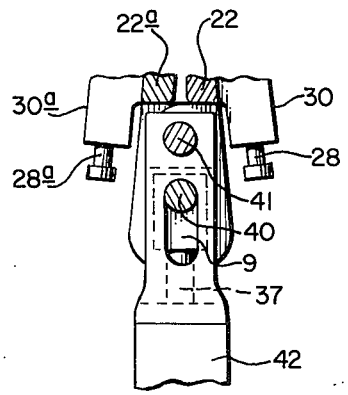
FIG. 6 is a broken, elevational view taken along lines 6—6 of FIG. 2.
Figure 7:
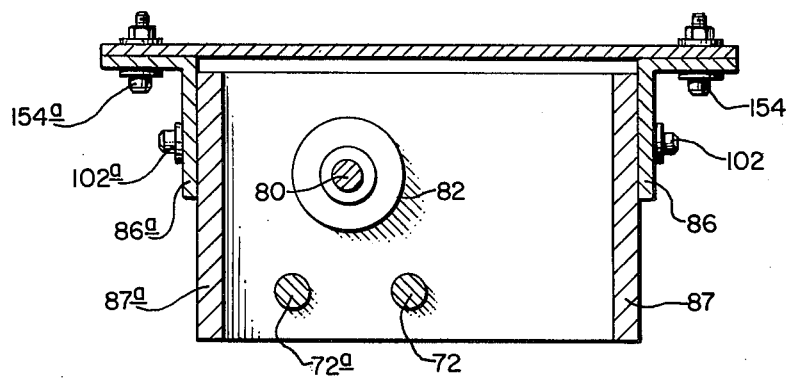
FIG. 7 is a cross sectional view taken along lines 7—7 of FIG. 2.

FIG. 6 is a sectional view showing detail of gripping actuator assembly 12. FIG. 7 shows the relative positions of longitudinal moving guides 72, 72a and double-acting pneumatic longitudinal cylinder arm 80.

As can be seen from the foregoing, the apparatus of this invention provides a positive manner for withdrawing blow molded plastic articles from mold halves and precisely placing them in desired position.

Exemplary of the plastic containers which may be held by the apparatus of this invention are those made of various thermoplastic material, e.g., high, medium or low density polyethylene, polypropylene, polystyrene, styrene acrylonitrile polymers, polycarbonates, nylon, acetyl polymers or copolymers, polyvinyl chloride polymers or copolymers or the like.

I claim:

1. An apparatus for removing, from a split blow mold, a blown plastic article having a tail extending out of said mold which apparatus comprises:
   a. a gripping means for gripping said tail, said gripping means having a first jaw and a second oppositely opposed jaw, said jaws being pivotally connected one to the other and said first and second jaws each carrying a spring ejector means whereby an outward spring pressure is applied to the bottom of said article when said article is extracted from said split blow molds;
   b. gripping actuation means attached to said gripping means for closing said gripping means to grip said tail and for opening said gripping means to release said tail;
   c. arcuate moving means attached to said gripping actuation means for moving said gripping means in an arcuate direction;
   d. longitudinal moving means for moving said gripping means in a longitudinal direction towards and away from said tail; and
   e. support means movably attached to said longitudinal moving means.

2. The apparatus of claim 1 wherein said arcuate moving means and said longitudinal moving means are double-acting pneumatic cylinders.

3. The apparatus of claim 1 wherein said gripping actuation means comprises:
   i. at least one pair of downwardly depending slotted legs, one of said legs being attached to said first jaw and said other leg being attached to said second jaw so that said slots in said legs overlap and form an acute angle at their intersection;
   ii. a slot follower which fits within said slots; and
   iii. gripping actuator power means for moving said slot follower within said slots whereby said jaws are caused to open and close.

4. The apparatus of claim 1 wherein said arcuate moving means comprises: an elongated arm rigidly connected to said gripping actuation means on one end and rotatably connected to an arm support means on the same end, said arm support means also being rigidly connected to said longitudinal moving means; and an arcuate power means being connected to the other end of said elongated arm.

5. The apparatus of claim 4 wherein said longitudinal moving means is a longitudinal power means connected to said arm support means whereby an upward or downward force applied to said arm support means by said longitudinal power means causes said gripping means to move in a longitudinal direction towards and away from said tail moil.

6. The apparatus of claim 3 wherein said arcuate moving means comprises; an elongated arm rigidly connected to said gripping actuation means on one end and rotatably connected to an arm support means on the same end, said arm support means also being rigidly connected to said longitudinal moving means, and an arcuate power means being connected to the other end of said elongated arm; and wherein said longitudinal moving means is a longitudinal power means connected to said arm support means whereby an upward or downward force applied to said arm support means by said longitudinal power means causes said gripping means to move in a longitudinal direction towards and away from said tail.

7. The apparatus of claim 6 wherein said gripping actuator power means, said arcuate power means and said longitudinal power means are double-acting pneumatic cylinders.

* * * * *